United States Patent [19]

Sirevag

[11] Patent Number: 5,405,223
[45] Date of Patent: Apr. 11, 1995

[54] METHOD FOR TREATING DRILL CUTTINGS DURING OIL AND GAS DRILLING

[76] Inventor: Gunnar Sirevag, Nokkveien 27, 4300 Sandnes, Norway

[21] Appl. No.: 66,028
[22] PCT Filed: Nov. 20, 1991
[86] PCT No.: PCT/NO91/00145
§ 371 Date: Sep. 14, 1993
§ 102(e) Date: Sep. 14, 1993
[87] PCT Pub. No.: WO92/09380
PCT Pub. Date: Jun. 11, 1992

[30] Foreign Application Priority Data

Nov. 28, 1990 [NO] Norway .................... 905156

[51] Int. Cl.⁶ ............................... B09B 1/00
[52] U.S. Cl. ........................ 405/128; 405/258; 175/66; 175/206; 175/207
[58] Field of Search ........... 405/128, 129, 130, 131, 405/258; 175/66, 206, 207

[56] References Cited

U.S. PATENT DOCUMENTS

| | | | |
|---|---|---|---|
| 3,400,819 | 9/1968 | Burdyn | 175/66 X |
| 3,513,100 | 5/1970 | Stogner | 252/301.1 |
| 3,713,499 | 1/1973 | Arscott et al. | 175/66 |
| 3,957,210 | 5/1976 | Durr | 241/46.02 |
| 3,964,557 | 6/1976 | Juvkam-Wold | 175/66 |
| 4,632,188 | 12/1986 | Schuh et al. | 166/368 |
| 4,787,452 | 11/1988 | Jennings, Jr. | 166/272 |
| 4,793,423 | 12/1988 | Knol | 175/66 |
| 4,942,929 | 7/1990 | Malachosky et al. | 175/66 |
| 4,969,775 | 11/1990 | Cappel et al. | 405/128 |
| 5,090,498 | 2/1992 | Hamill | 175/206 |
| 5,107,874 | 4/1992 | Flanigan et al. | 175/206 X |
| 5,109,933 | 5/1992 | Jackson | 175/66 |
| 5,303,786 | 4/1994 | Prestridge et al. | 175/66 |

FOREIGN PATENT DOCUMENTS

| | | | |
|---|---|---|---|
| 178695 | 7/1989 | Japan | 175/66 |
| 148704 | 8/1983 | Norway . | |
| 2179645 | 3/1987 | United Kingdom . | |
| 2237273 | 5/1991 | United Kingdom . | |
| 2238730 | 6/1991 | United Kingdom | 175/66 |
| 2239471 | 7/1991 | United Kingdom . | |
| 1182150 | 9/1985 | U.S.S.R. | 175/66 |
| 1476104 | 4/1989 | U.S.S.R. | 175/206 |
| WO80/01497 | 7/1980 | WIPO . | |

Primary Examiner—Randolph A. Reese
Assistant Examiner—John Ricci
Attorney, Agent, or Firm—Foley & Lardner

[57] ABSTRACT

The present invention relates to a method for treating drill cuttings during oil and gas drilling, in particular in connection with oil and gas wells below water. This invention aims at a secure and permanent depositions of drill cuttings without risking environmental pollution. This invention is based on the philosophy that there is made a dispersion or emulsion of drill cuttings in water, as the particles of drill cuttings, including all present contaminations, are disintegrated to obtain particles being so small that they may be dispersed in a relatively small amount of water. As no particle has a size above a predetermined tiny value, this dispersion may be pumped into most existing subsea structures and are thus permanently disposed of. The method is based on a continuous crushing and cleaning process, preferably including several stages, and where the process comprises several feedback paths and circulating loops resulting in the fact that portions of the treated material run through the process several times until the desired, stable dispersion has been reached.

9 Claims, 3 Drawing Sheets

METHOD FOR TREATING DRILL CUTTINGS DURING OIL AND GAS DRILLING

BACKGROUND OF THE INVENTION

The present invention relates to a method for injection of waste materials in subsurface formations via drilled holes in the ground, where the materials are mixed with water before injection.

This invention more specifically relates to such a method where the waste materials at least comprise relatively large solid particles, for instance represented by drill cuttings.

It is earlier known using a similar method to dispose of harmful materials in excisting oil wells below water. Such solutions are for instance mentioned in the newspaper article "Toxic waste could be hurried in old oil wells" by Jane Bird in Sunday Times, Aug. 19, 1990.

The earlier known method has only been used in connection with liquid waste materials. When such liquids has been diluted with water, this has primarily been done to disolve the liquids to reduce risks during handling. However the known method has not been used for waste materials comprising large amounts of solid materials.

The subsurface formation in which the waste materials earlier have been injected, are substantially porous structures where solid matters which possibly are introduced shortly will clog the pores in said structure and thus prevent or impede further intrusion. As far as we know attempts of such injection of materials comprising solid particles in subsurface formations have not been undertaken. If such attempts should be made it should probably give the result that only small amounts of any waste material could be forced into the structure because the pores would be clogged by solid particles when such are present, and this clogging should prevent further filling of the structure. It should also be mentioned that such experiments including injection are very expensive and cannot be undertaken if real and good expectations do not exist.

The object of the present invention is to obtain a method according to which injection of waste materials including relatively large amounts of coarse solid particles into subsurface formations, in such a manner that the waste into subsurface formations, in such a manner that the waste materials can be rendered harmless for all future. This is obtained as the waste materials are transformed in such a manner that they after the transformation may be injected in large amounts in existing subsurface formations and structures without the above disadvantages. By using the method according to the present invention it would be possible to obtain an injection of waste materials of the type mentioned above into subsurface formations and structures so that these formations substantially or completely will be filled by the injected waste materials without any considerable space left empty. Large amounts of waste material comprising considerable amounts of solid matters therefore may be injected into porous formations and structures as layers of sand, clay, or stone, and in existing pockets. The method according to this invention may also be used to squeeze remaining fragments of oil and gas out from a production well, for instance by injecting the waste materials in an adjacent well on the same oil field.

This invention in particular relates to a method treating drill cuttings during oil- and gas-drilling, also in connection with oil- and gas-wells below water, as the method results in a safe and permanent deposition of drill cuttings without giving detrimental effects on the environment.

The problem related to disposal of bore cuttings which are surfacing during drill operation has been aproached in many different manners. According to many of the previous methods large efforts have been made to clean the drill cuttings to regain valuable consistuents therefrom. Among earlier suggested solutions the following may be mentioned: cleaning by washing with sea water, pelleting, storing in a wide, vertical tube arranged on the sea bottom to be filled with drill cuttings from above and possibly with removal of oil components released in the tube. Attempts have also been made in which the drill cuttings are grinded in a mill. This is done in hope that frictional heat developed during the grinding process will evaporate the oil components and removed therefrom the drill cuttings.

The present invention aims at a complete and final treatment of drill cuttings surfacing during a drilling process. The treatment of the drill cuttings are not cleaned previous to the deposition process, but are disintegrated by crushing while all its ingredients remains intact. The crushing process is repeated until particles above a certain predetermined size no longer exist. From these particles a dispersion and/or an emulsion in water is produced. This dispersion may be disposed of in existing, subsea structures at a pressure required for the structure of the formations at the site and the depth at which the depositing is undertaken.

Earlier known methods for depositing drill cuttings have first of all led to great contamination problems. These problems are increasing and have recently overruled the cost and time aspects of these proceedings. The object of the present invention is to obtain a method for treating and depositing drill cuttings, that over comes to which the earlier known problems, where the costs and the required treatment time are to lower than previously obtained.

When the expression injection is used this also assumes that the waste materials advantageously can be led back to the site in which they initially were found. However the method may also be used to deposit the waste material in places from which other materials are removed, or possibly in special wells produced in stable and suitable formations or in weak and crumbeling zones.

In using a method according to the present invention waste materials are injected in subsurface formations as the waste materials first mixed with liquids and then are injected into subsurface formations, via drilled holes or wells in the ground.

The features for the present invention include the waste materials, including relatively large solid particles, are crushed and then washed out in a liquid to form a dispersion, the larger particles in the dispersion enter a feedback loop to be chrushed again, at least one portion of the finished dispersion is brought to circulate in the process at the same time as more solid matter is added so that a thickening of the dispersion is obtained, and that the dispersion, when stabilized and when it no longer comprises redundant amounts of liquids, is injected at a suitable pressure into the subsurface formations.

BRIEF DESCRIPTION OF THE DRAWINGS

To give a clearer and more unambiguous description of the present invention it is shown to the detailed description given below, and to further explain the invention it is also referred to the accompanying drawings, in which.

DETAILED DESCRIPTION OF THE PREFERRED EMBODIMENT

Figure 1:
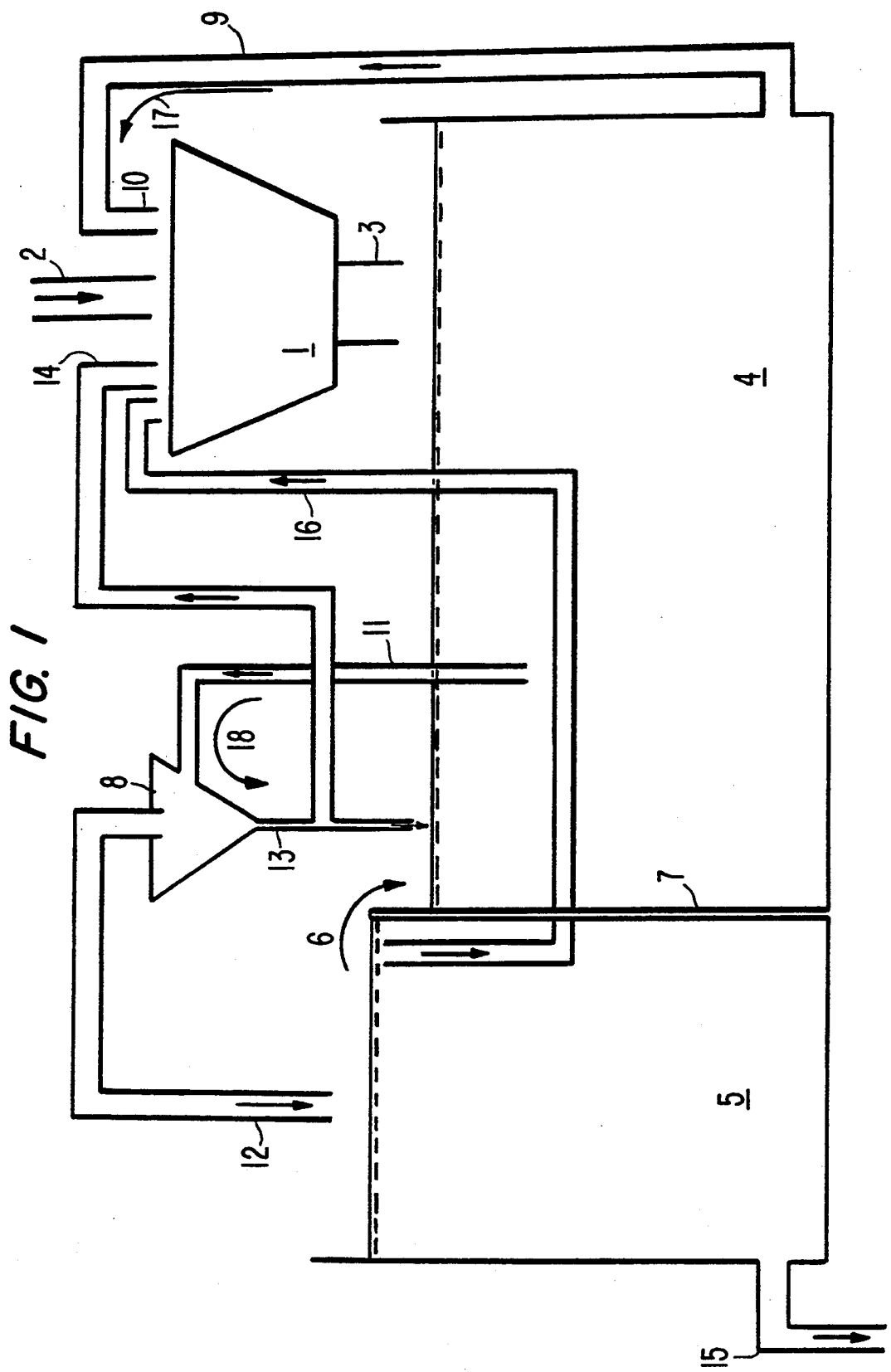
FIG. 1 schematically illustrates the main features of the process used when the method according to said invention is undertaken.

In FIG. 1 a crushing machine 1 is shown having an input port 2 and an output port 3. The output port 3 from the crushing machine leads down into a mixing receptacle 4. Adjacent to the mixing receptacle 4 there is a mixing container 5 which possibly, but not necessarily, may flow over (as suggested by the arrow 6 passing over the partition 7 which separates the to containers).

As suggested by the simplified representation in FIG. 1 the crushing machine 1 may preferably be arranged above mixing receptacle 4 and in addition a separating device 8 may be arranged, which are classifying the received material.

From the mixing receptacle 4 a feedback device 9 leads backwards to a further input port 10 to the crushing machine 1, and in addition a conveyer device 11 leading from the mixing receptacle 4 to the sorting device 8 is shown. From the sorting device 8 a dispersion pipe 12 is passing down in the treatment container 5 and also a second feedback device 13 which leads down in the mixing receptacle 4. This second feedback device 13 may alternatively to the crushing machine, and to a further, third input port 14 thereon. It should also be mentioned that the second feedback device 13 simultaneously may be connected to both the mixing receptacle 4 and the third input 14 of the crushing machine 1. Finally it should be mentioned that the plant may be emptied via an optional injection pipe 15 leading from the treatment container 5 downwards to the rock formation into which the waste materials shall be injected.

The method according to the present invention will be better understood by means of a description explaining the operation of the equipment of which the principle is shown in FIG. 1. The operation of the equipment will be explained below, where references made to specific embodiments only are intending to represent examples without any limiting effect on the scope of the claims. When the shown plant is started both the mixing receptacle 4 and the treatment container 5 may already be filled with liquid. Initially waste materials preferably including drill cuttings mixed with slurry or water, is supplied to the input port 2 of the crushing machine 1. At least the coarser particles included in the waste material received through the input port 2, are crushed in the crushing machine 1, and the masses flowing out from output port 3 and falling down into the liquid present in the mixing receptacle 4, will be somewhat more homogeneous than the waste material at input port 2. Within the plant which are shown on FIG. 1 the liquefied masses in the mixing receptacle 4 may circulate in two different manners. On the first hand the liquefied compound in the mixing receptacle 4 may flow backwards through the feedback device 9 to the input port 10 on the crushing machine 1. The feedback arrangement ends at, or close to the bottom of the mixing receptacle 4 and the liquefied mass entering this point therefore will comprise a substantial portion of large particles which may have precipitated or sedimented in the mixing receptacle 4. In addition the liquefied mass in the mixing receptacle 4 is transported through the conveyer device 11 to the sorting device 8. The input zone of the transporting device 11 is arranged rather high up in the mixing receptacle 4, and because of this the mass transported therethrough shall mainly consist of fine particles disperged in the liquid. As shown on the figure a portion of this mass will be guided back to the mixing receptacle 4 via the second feedback device 13 as explained below. Now it only should be mentioned that there are two loops 17, 18 providing a further treatment of the liquefied mass aggregated in the mixing receptacle 4. Finally it should be mentioned that some of the liquefied mass from the receptacle 5 may flow over the partition 7 (at arrow 6) to the mixing receptacle 4. The feedback volume of dispersion from the treatment container 5 to the receptacle 4 will be dependent of the pumped out amount via the injection tube 15 to the ground formation. Feedback of dispersion to the mixing receptacle 4 may also take place via the tube 16.

The sorting device 8 may be designed according to many different principles. At the moment it may be considered as a simple hydrocyclone in which the transporting device 11 is connected to the side of the hydrocyclone 8 which separates the received, liquefied mass so that the thinner part of same is guided through the overflow connection via the dispersion pipe 12 down into the treatment container 5, while the coarser particles is guided as underflow through the other feedback arrangement 13 to the mixing receptacle 4 and/or to the third input port 14 of the crushing machine 1.

Now all the most important and necessary circulating loop arrangements required to obtain a method according to the present invention has been shown in one specific embodiment, however in a schematic way. According to this method the waste materials (entering through the input port 2) including relatively large amounts of solids, are crushed and washed out in a liquid (possibly already initially present in the mixing receptacle 4 or added through the input port 2) so that a dispersion is built up, that the coarser particles in this dispersion is fed backwards (through the feedback arrangement 9) in the process to be crushed again, that at least one portion of the dispersion is forced to circulate in the process (for instance via the transportation loop 18 including the conveyer device 11 and the second feedback device 13), while more solid matters are added (via the input port 2) to give a constantly thickening of the dispersion, and that the dispersion as soon as it has been stabilized (which gradually shall take place during the thickening process as the stabilized dispersion is collected in the treatment container 5), is injected at a suitable pressure (via the injection pipe 15) into the subsurface formations (not shown on the figure).

In addition to the details mentioned above overflow liquid having a low viscosity may be guided through a further, third feedback device 16 leading from the surface of the dispersion gathered in the treatment container 5 to the input port 2 of the crushing machine. This feature is also suggested on FIG. 1.

It shall also be mentioned that the process according to the present method either may be undertaken in batches, so that a stable dispersion having a suitable consistency is produced in the treatment container 5 and that no injection is undertaken until a desired consistency and stability of the dispersion in the treatment container 5 is obtained. Then the total content in this container is injected through pipe 15 without any considerable delay, however the process may also run continuously and then no injection should take place just after the starting operation. Then the process could be performed with an empty treatment container 5 and without the third feedback device 16, while injecting may run continuously from the treatment container 5 during operation.

Figure 2:
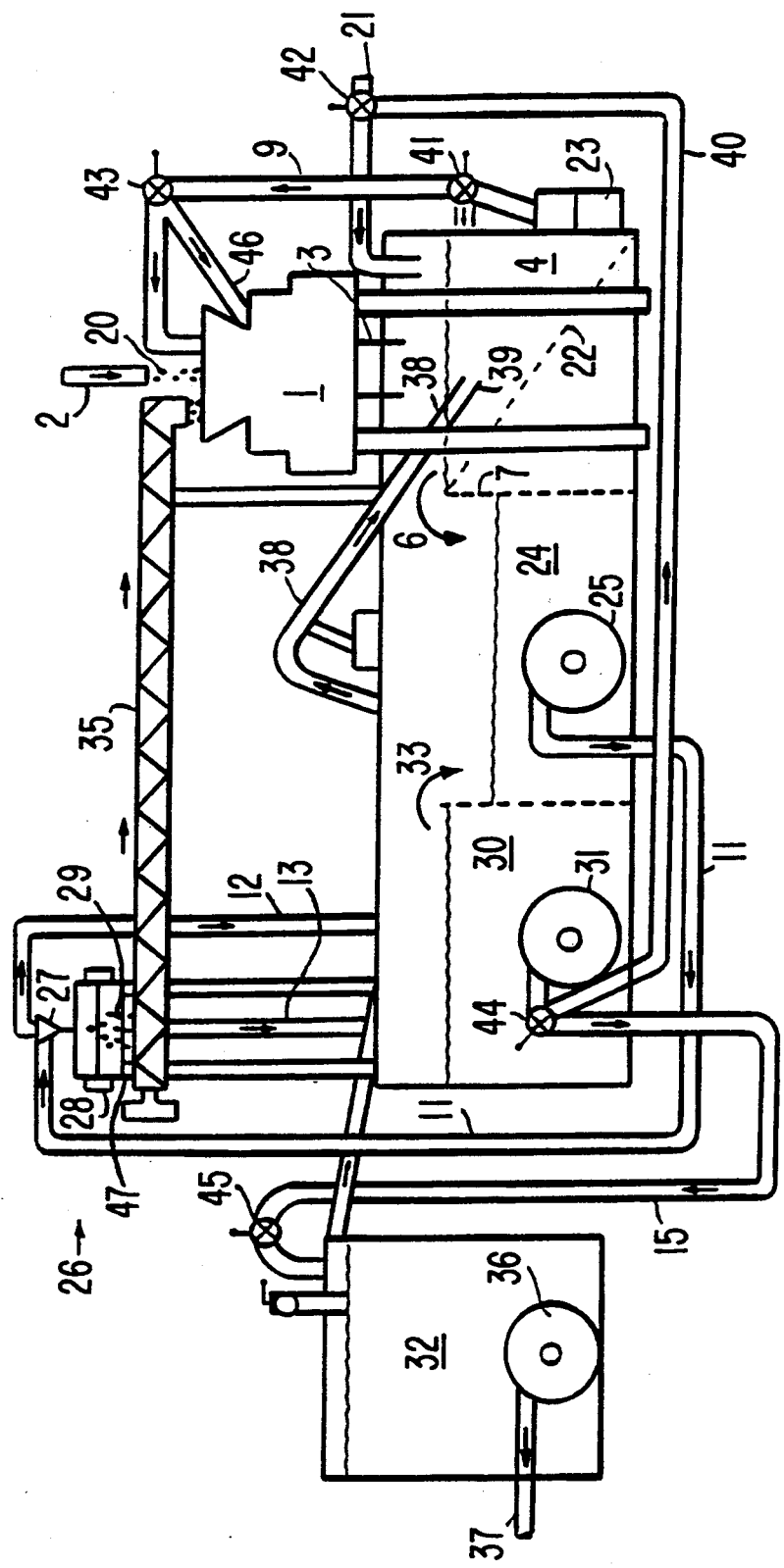
FIG. 2 and 3 show a relatively simple embodiment of a plant which may be used to implement the method shown in FIG. 1, shown in elevation and from above, respectively.
Figure 3:
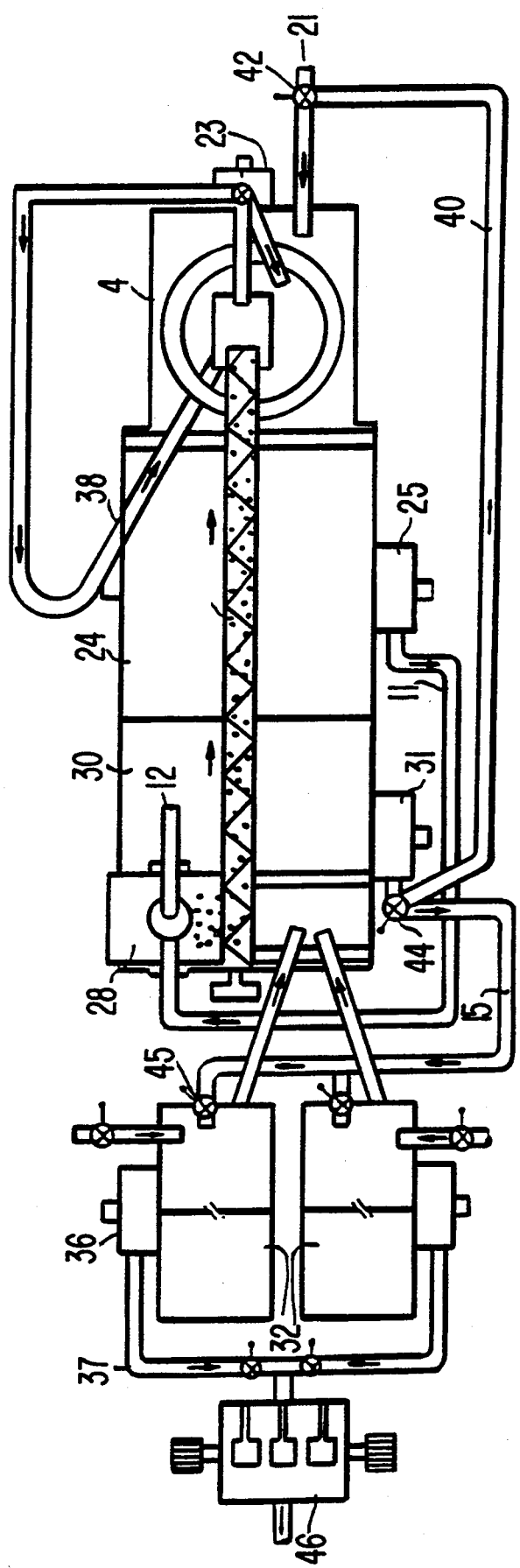

On FIG. 2 and FIG. 3 a more complete implementation of a plant designed to carry out a method according to the present invention, is shown.

As mentioned above FIG. 2 illustrates an elevation of the plant while FIG. 3 shows the same plant seen from above. These figures are also schematical representations and thus only illustrates the main features and the principal solutions of the implementation. Where possible the same reference numbers are used as in FIG. 1. Below it is referred to both FIG. 2 and FIG. 3.

The waste materials 20 which are to be treated by means of a method according to the present invention enter the plant through the input port 2 and fall down into the crushing machine 1. The crushing machine 1 may preferably consist of a sentrifugal crusher, possibly a sentrifugal crushing machine of the autogenous type, in which the solid particles will be vigorously aggitated by a rotor (not shown) and quite a lot are crushed as they collide at high velocities. A chrushing machine of this kind is very well adapted as it will not be clogged even when very large amounts of solid matters are received. As an example of a proper crusher a BAR-MAC sentrifugal crusher may be mentioned. The obtained compound is then applied to the mixing receptacle 4 via the output port 3.

The method according to the present invention gives still further advantages explained below.

A complete plant for treatment of drill cuttings according to the method of the present invention, comprises at least one crushing machine and at least two containers or tanks. A relatively simple embodiment is shown in FIG. 2 and FIG. 3.

The plant designed has at least one input port 2 through which a mass or compound 20 comprising drill cuttings are supplied to the crushing machine 1, and at least one output port 3 leading from this crushing machine to a first mixing receptacle 4. This receptacle 4 is in addition equiped with at least one further input port 21 for excisting water, e.g. so that this water input is applied in parallel with the output port 3 from the crushing machine 1 down into the first mixing receptacle 4. From this receptacle, and preferably from its lower portion, a feedback pipe 9 transporting a portion of the content and substantially the portion having relatively large particle size, is coupled backwards to the input of the crushing machine 1. This feedback loop 9 is, in one embodiment preferably arranged so that it also results in an agitation of the contents of the first receptacle and it may in addition be designed so that the thinnest portion of the compound which is feedback in the system not necessarily has to pass the complete process in the crushing machine. A further crushing machine may also be arranged to handle the returning compound to give this portion a somewhat different treatment, for instance in such a manner that the returning compound is crushed into finer particles than in the first crusher. Below a somewhat more detailed description will be given of such embodiments.

Once the process has been started the mixing receptacle 4 soon will be filled by a liquid mixture comprising disintegrated drill cuttings and water, and this mixture will be agitated continuously. The mixing receptacle may have an open top and shall flow over (at 6) when completely filled up. It should also be mentioned that the mixing receptacle preferably may be equipped with a slanting bottom 22, and the mixture which is to be fed backwards in the system, is collected from the lower part of this slanting bottom so that all the larger particles will be fed back in the system due to this inclining effect and shall not stop on this stage in the process. The feedback operation is preferably maintained by means of a vane pump 23 of the centrifugal type having a large input port, possibly a so called agricultural pump.

The compound flowing over from the mixing receptacle at 6 shall flow further into a new container which may be referred to as a sand removing tank 24 or setting pit. From this setting pit 24 the compound is pumped by means of the second vane pump 25, through a sand removing unit 26 which may comprise one or more hydrocyclones 27, preferably a plurality of hydrocyclones in parallel, and also a classifying unit, for instance implemented as an optional, vibrating screen 28. From the bottom of the hydrocyclones 27 wet particles 29 having a relatively large but not classified size fall out, while water including very small particles of the crushed drill cuttings dispersed or emulsified therein shall flow out from the top of the hydrocyclones. This dispersion comprising the small drill cuttings and water is led up into a third container which may be referred to as an output tank 30, and from this the dispersion is pumped further, by means of the third vane pump 31, to the last tank 32 which may be referred to as an injection tank. The pump 31 used at this stage may also preferably be a so called agricultural pump. If the output tank 30 is overfilled, the overflow shall be guided backwards (arrow 33) to the setting pit 24. As long as the injection tank 32 comprises a redundant amount of liquid, this redundant amount will flow backwards via the feedback tube 34 to the output tank 30. The dispersion therefore shall circulate in the plant all the time and it will be thickend steadily more as more solid matters 20 are added.

Considering the particles falling out from below the hydrocyclones 27, these particles will fall down into a gathering pan after having passed through the meshes in an optional, vibrating screen 28, through which only particles of a size less than a pretermined value given by the mesh size passes. The particles falling down through this screen are guided via the gathering pan 47 below the screen, down into the output tank 30 together with the dispersion which enters from the top of the hydrocyclones. The particles which do not pass through the meshes in the vibrating screen 28 as their diameter is oversized, are transferred to the conveyer 35 for solid particles and by this the coarser particles are guided further into the process. However, these larger, solid particles may be treated in different ways, all within the scope of this invention.

The plant may for instance be equipped in such a manner that the conveyer 35 takes the larger solid particles directly back to the input port of the crushing machine 1 so that these particles have to pass the crushing process an additional time.

The plant may also be operated even if the vibrating screen is completely avoided or is not moving. The larger particles which are guided backwards in the system will then comprise a larger amount of liquids.

According to still a further possibility the conveyer 35 transports the particles to a further crushing machine of a different type than the one through which the drill cuttings already has passed (not shown on the figures). Such a crushing machine may for instance be a mill especially designed for milling of sand, and from this will the obtained sand may again be guided down into the mixing receptacle 4 together with the earlier mentioned crushed drill cuttings which have passed through the first crushing machine 1.

Still a further possibility may be mentioned as the larger, solid particles may be guided onto a conveying screw 35 of the sand washing type, often referred to as a sand washing helix, in which the particles are cleaned by means of countercurrently running water so that they are completely cleaned when arriving the opposite end of the conveyer. Using this technique the separated, larger solid particles may, when they are cleaned and purified, without any danger for the environment be led directly back to the water surrounding the platform, while the separated, contaminated waste liquid may be guided backwards to the output tank 30. Cleaned particles may also be filled directly in large bags from the sand washing helix 35.

Considering the dispersion which were pumped from the output tank 30 to the injection tank 32, this should preferably be collected in batches. With this technique it is preferred using at least two injection tanks 32, as only one injection tank is filled at a time. This is shown on FIG. 3. The dispersion arriving at the injection tank 32 preferably includes very few particles above 75 micron in diameter, and no one larger than one millimeter. If the dispersion contains redundant amounts of water, this water may be guided away via an overflow 34, back to the output tank 30 or even quite back to the mixing receptacle 4.

When one of the injection tanks 32 has been filled with dispersion having the mentioned qualities, this filling operation comes to an end while filling of the other injection tank starts. During the filling operation of the second tank, the first one which now is filled up, may be emptied. This tank is emptied by a pump 36 feeding a vane pump 46 which in turn provides the pressure required to pump said dispersion of fine particles into subsea structures of present consistency and at desired depths. An alternative may be using a high pressure pump 36 which directly feeds a tube/pipe-system 37 which endures the current pressure and is applied to empty the filled up injection tank 32 as the dispersion is pumped into a suitable subsea structure. Then said injection tank again will be ready for filling. The pump 36 may possibly also be represented by a pressure amplifying pump arranged at the input of a high pressure pump 46 to obtain injection at high pressures.

The described plant according to the present invention gives a very fast treatment of the drill cuttings. This treatment may go on continuously even when the dispersion is built up in batches, as redundant material continuously is fed backwards to previous stages in the process, and therefore inhibits clogging anywhere in the plant. Thus bottle necks, in which the production of the dispersion comes to a stop, do not occure. To this end it is important that all the pumps are open vane pumps having large input and output ports which not easily are clogged by passing coarse materials. Such a functioning may also be secured as the crushing machine(s) is(are) designed so that passage of objects being too large to be easily handled by all the pumps is not allowed.

It should also be mentioned that bulk feedback from the mixing receptacle preferably may be effected by guiding a portion of the masses directly back to a jet or gun 28 which vigorously, but with a certain deflection and with a movable orifice 39, will squirt the feedback masses down into the mixing receptacle 4 with large energy and thus create an agitating and stirring movement in the mixing receptacle 4, while another portion of the feedback bulk may be guided between the rotor and the stationary rim on the crushing machine, which results in an autogenous crushing at a low energy comsumption, as particles having different sizes are crushed when by hitting each other at high velocities, while the larger feedback particles preferably are guided directly to the main input port of the crushing machine. Finally it may be mentioned that the pump 31 in the output 30 also preferably may branch a part of the stream backwards in the plant through the feedback pipe 40 to the water input port 21. This will also enhance the circulation of the finished dispersion.

At a lot of places in the feedback loops there may preferably be arranged valves, such as 41, 42, 43, 44 and 45. These valves divide the streams in suitable partial streams, and they may be controlled manually or in a different manner.

As to the mode of operation of this plant it will mainly be apparent from the description above. All the same the main procedures will be described below. Raw or not treated drill cuttings, possibly mixed-up with sand, water and mud from the drilling operation, is applied to the input port 2 of the crushing machine 1, and the crushed, mixed-up compound goes into the mixing receptacle 4 where the larger particles, because of the slanting bottom 5, shall concentrate at one side of the mixing receptacle and then these particles are guided sideways into the pump 7 being of the vane type with a large opening in its side wall, and from here the feedback material is carried upwards and, by means of the valve 41 some of it returns to feedback jet 38 provided with a nozzle 39. An additional input port 21 may also be arranged, and this preferably supplies water directly to the mixing receptacle 4. Sea water may preferably be used when available. The nozzle 39 and the jet device 38 are movable parts and will create a vigourous agitating movement in the mixing receptacle 4 so that no particles are clogging or setting here, but are constantly not circulating in the process. Another portion of the feedback bulk material is carried further up to the valve 43, from which one tube is leading quite to the top, i.e. quite to the main input port of the crushing machine 1, while another is pipe branching off to an input port 46 on the side face of the crushing machine. The largest particles will fall down through the main input port on the top of the crushing machine 1 and shall hit the rotor wings within the machine and be accelerated of same. As the particles are moving vigourously in different directions an autogenous crushing shall result, as the particles are crushed when colliding. The crushing machine may preferably be an autogenous crushing mill, for instance of the type BARMAC.

The described feedback process according to which some parts of the masses which are passing through this process are to be treated several times while other portions of the said masses will pass directly through the system, represents an important principle of the invention. Corresponding or somewhat different feedback loops are arranged at other points in the equipment as already described above. According to this the feedback process related to the mixing receptacle 4 and the crushing machine 1 should be suffienly explained. On the figure only one embodiment including one single crushing machine 1 is shown, but the invention also comprises embodiments including two, preferably different crushing machines to meet these requirements, and a mill adapted for crushing of sand may e.g. be used on the particles recirculating in the process via the conveyer 35.

Finally it should be mentioned that the method may be still further improved by adding hard grinding elements, for instance steel balls or reinforcement rod cuttings to the masses. These grinding elements then preferably join the feedback process passing the crushing machine. Here the grinding elements will assist in crushing of the most endurable particles, while the elements are circulating in a small, closed feedback loop which they never leave because of their size.

By means of a plant according to the present invention it will be possible to ensure that the resulting dispersion only includs particles having a size of 100 micron or less. At a test plant in which a BARMAC autogenous crushing mill with verticle shaft was used, 95% of the drill cuttings particles obtained a size less than 100 micron and no particles above 1 mm in diameter was passing the crushing machine after the first stage of the process.

According to the present invention it is developed, by using components, per se earlier known from landbased mining, an apparatus suitable also in marine environments within this especial field of technique. Further a very fast acting equipment has been developed, it may for instance been mentioned that a BARMAC crushing machine may handle 7.7 tons drill cuttings per hour. With some minor modifications this machine may in fact take care of 15 tons of drill cuttings each hour. Although the machine in an unmodified version cannot grind the finer sand particles but only coarser drill cuttings, this problem may in accordance with the present invention be solved in a simple manner by feeding the sand particles backwards to a separate sand mill.

I claim:

1. A method for injecting waste material into a subsurface formation comprising the steps of:
   (a) crushing waste material having solid particles in a first crushing process to obtain a crushed waste material comprising fine particles and coarse particles;
   (b) forming a liquified mass aggregate by mixing the crushed waste material with a liquid, wherein the liquified mass aggregate contains a homogenous dispersion comprising the liquid and the fine particles and a non-homogenous phase comprising the coarse particles;
   (c) feeding the coarse particles of the non-homogenous phase to at least one of (1) the first crushing process and (2) an additional crushing process and performing additional crushing;
   (d) returning a portion of the homogenous dispersion to the first crushing process for circulation with additional crushed waste material comprising fine particles and coarse particles in order to thicken the homogenous dispersion to obtain a finished dispersion that has a density and homogenous context suitable for injection into the subsurface formation; and
   (e) injecting the finished dispersion into the subsurface formation.

2. A method according to claim 1, wherein the steps of (a) through (d) are run continuously to form batches of finished dispersion and the step of injecting is done only when at least one complete batch of finished dispersion is formed.

3. A method according to claim 1, further comprising the step of gathering the finished dispersion at a specific location before injecting step is done.

4. A method according to claim 1, further comprising the step of separating hard and/or contaminated particles from the liquified mass aggregate and subjecting the particles to a treatment process.

5. A method according to claim 1, wherein the step of feeding back the coarse particles occurs from at least two separate places in a plant arranged to complete step (a) through (d).

6. A method according to claim 1, wherein the step of feeding back the coarse particles further includes subjecting the coarse particles to at least one finishing process.

7. A method according to claim 1, wherein the step of feeding the coarse particles further comprising the steps of:
   (f) determining if the coarse particles are crushable;
   (g) washing and/or purifying the uncrushable coarse particles;
   (h) filling containers with purified coarse particles; and
   (i) transporting the containers to a location to be used as purified waste material.

8. A method according to claim 1, wherein the step of feeding the coarse particles further includes adding hard grinding elements to the course particles to assist in the step of performing additional crushing and providing the hard grinding elements with a size such that they never become part of the finished dispersion.

9. A method according to claim 1, wherein the step (d) further includes a finished dispersion with particles not greater than 1 mm.

* * * * *